(12) United States Patent
Kimball et al.

(10) Patent No.: US 6,625,510 B2
(45) Date of Patent: Sep. 23, 2003

(54) COMPUTER-BASED TOOL MANAGEMENT DOCUMENTATION SYSTEM

(75) Inventors: Harold A. Kimball, Manahawkin, NJ (US); Robert R. Carbrey, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 176 days.

(21) Appl. No.: 09/880,294

(22) Filed: Jun. 13, 2001

(65) Prior Publication Data

US 2002/0193898 A1 Dec. 19, 2002

(51) Int. Cl.[7] ............................ G06F 19/00; B25B 00/00
(52) U.S. Cl. ............................ 700/108; 700/104; 81/8.1
(58) Field of Search .............................. 700/108, 104, 700/96, 99, 160; 81/8.1; 206/349, 803; 224/910, 931

(56) References Cited

U.S. PATENT DOCUMENTS 5,023,800 A * 6/1991 Carver et al. ............... 700/182

OTHER PUBLICATIONS

Coward, Robert; Mastering Windows 3.1: Special Edition; 1992, First Edition, Chapter 14.*

* cited by examiner

*Primary Examiner*—Leo Picard
*Assistant Examiner*—W. Russell Swindell
(74) *Attorney, Agent, or Firm*—Ron Billi

(57) ABSTRACT

A computer-based system to create and modify documents used in a tool management program. A word processing module is used to create the document, in conjunction with a graphics module. The graphics module includes representations of all of the tools used in a maintenance program, as well as representations of toolbox panels into which the tools are placed. A user simply drags selected tools into selected panels to. create a tool-filled panel graphic which may be directly imported into the document in the word processing module. The tools also have certain attributes defined by associated data. A data interface arrangement is operable to convey certain selected data from the graphics module to the document in the word processing module, after preselected sorting.

13 Claims, 8 Drawing Sheets

- STANDARD TEXT
- TOOLBOX DRAWINGS — 44

DATA RE: TOOLS IN PANELS — 45

GRAPHICS RE: TOOLS IN PANELS — 46

DATA RE: TOOLS IN PROGRAM — 47

NAVAIR 17-1FA18EF-1

SECTION 6
QUALITY ASSURANCE TOOL LIST
AND CONTAINER LAYOUT 6-1 INTRODUCTION

THE TOOL LIST AND LAYOUT FOR THE CONTAINERS ASSIGNED TO QUALITY ASSURANCE ARE PRESENTED IN THIS SECTION. THE TOOL LIST INDICATES THE TOOL AND INDICATES THE TOOL AND IDENTIFIES IT BY NUMBER AND PANEL FOR READY REFERENCE TO THE LAYOUT DIAGRAM. THE HARDWARE USED TO MOUNT THE TOOLS IS ILLUSTRATED IN SECTION V OF THIS MANUAL.

6-2 TOOL LIST AND LAYOUT

A. QA-1 INSPECTION BOX (PAGE -1). SEE FIGURE 6-1.

F/A-18 QA-1 INSPECTION BOX
A-BOX (ONE PER EACH FIVE AIRCRAFT)

PANEL A

| ITEM | | FIGURE |
|---|---|---|
| 1 | PLATE, MARKING, BLANK, TOOL | 5-19 |
| 2 | PLATE, MARKING, BLANK, TOOL | 5-19 |
| 3 | PLATE, MARKING, BLANK, TOOL | 5-19 |
| 4 | FLASHLIGHT, FLEXIBLE EXTENSION, 24" | 5-16 |
| 5 | FLASHLIGHT, MAG, 2 CELL | 5-16 |
| 6 | FLASHLIGHT, MAG, 2 CELL | 5-16 |
| 7 | BOOTIES | 5-12 |
| 8 | BOOTIES | 5-12 |

PANEL B

| ITEM | | FIGURE |
|---|---|---|
| 1 | MIRROR, INSPECTION, EXPANDABLE | 5-6, 5-16 |
| 2 | MIRROR, INSPECTION, RECTANGULAR, 11" | 5-6, 5-16 |
| 3 | RULE, STEEL, MACHINIST'S, FLEXIBLE, 6, NO. 5 | 5-6, 5-16 |
| 4 | KEY, SOCKET HEAD SCREW, HEX, T HANDLE, 7/32" | 5-6, 5-16 |
| 5 | MAGNIFIER, 4" DIAMETER | 5-13 |
| 6 | FINGER, MECHANICAL, FLEXIBLE, 17-1/2" | 5-6, 5-16 |
| 7 | RETRIEVING TOOL, MAGNETIC, TELESCOPING | 5-6, 5-16 |

COMPUTER-BASED TOOL MANAGEMENT DOCUMENTATION SYSTEM

STATEMENT OF GOVERNMENT INTEREST

The invention described herein may be manufactured and used by or for the Government of the United States of America for government purposes without the payment of any royalties therefor.

BACKGROUND OF THE INVENTION

There are many establishments, both military and civilian, which have various types of vehicles, machinery, systems, or the like, which require periodic maintenance. By way of example, in the field of military aviation, an establishment may have many different types of aircraft, each with perhaps more than 100 different types of maintenance service requirements. Each such maintenance service requirement necessitates its own unique set of maintenance tools.

In addition, space limitations often necessitate the use of compact toolboxes containing only the necessary tools required for each specific maintenance operation. As an example, on board an aircraft carrier, many different types of aircraft must be serviced for several months while at sea. All of the tools and parts necessary for servicing aircraft on deployment must be readily available on the aircraft carrier. In order to obviate the requirement of transporting a multitude of various tools to a maintenance worksite, each of the maintenance service requirements has a designated toolbox containing only the particular tools necessary to perform the required maintenance task (including repairs) on the aircraft.

A tool management program in current use for aircraft provides for tool accountability, eliminates aircraft accidents and incidents and associated equipment damage due to lost, misplaced or broken tools. Each tool has an assigned location within the toolbox to help keep track of all the tools within the toolbox and to quickly identify any missing tools.

As part of a tool management program, a document, or manual is created for each aircraft upon which various maintenance tasks are to be performed. This manual contains explanatory text as well as outline drawings of the various tools positioned within respective panels of a toolbox. In addition, the manual contains an itemized listing of such tools for each panel, and a total listing summarizing all tools used on the entire maintenance program for the aircraft.

The creation and any subsequent modification of these manuals is extremely costly and time consuming, particularly in the graphics portion depicting tool-filled panels and in the presentation of data associated with the tools. If a particular task changes, necessitating an addition or deletion of one or more tools to the toolbox, not only must new tool-filled panels be drawn and substituted for the old ones, but the itemized listing must be appropriately changed as well as the total listing summarizing all of the tools used on the entire maintenance program for the aircraft.

The system of the present invention is instrumental in designing such customized toolboxes for specific maintenance tasks, and is capable of rapidly and easily modifying the manual to accommodate for any tool changes in the program.

It will be appreciated that although reference is made herein to aircraft on board an aircraft carrier, the invention is equally applicable to other environments such as commercial airlines, the automotive industry and any manufacturing industry that requires control and accountability of tools, including parts, inventory items, etc,

SUMMARY OF THE INVENTION

A computer-based system is provided for creating and modifying a tool management document. The document is comprised of various portions, including graphics portions and data portions, with the graphics portions representing tools positioned within panels of toolboxes used in a comprehensive maintenance program.

The computer has a word processing module-, a graphics module-and a data interface arrangement linking the word processing module-and graphics module. The graphics module has stored tool representations and stored panel representations whereby a user may select certain tools to be graphically placed within certain panels to create a tool-filled panel. This tool-filled panel representation may be placed directly into the graphic portion of the document.

The tool and panel representations have certain attributes defined by associated data. The data interface arrangement, which is comprised of a interface module and sort module, is operable to extract data, defining the attributes, from the graphics module and to sort and place only selected data into the data portion of the document.

BRIEF DESCRIPTION OF THE DRAWINGS

The invention will be better understood, and further objects, features and advantages thereof will become more apparent from the following description of the preferred embodiments, taken in conjunction with the accompanying drawings, in which:

FIG. 2 depicts various portions of a tool manual produced in accordance with the present invention.

FIGS. 4A and 4B are pages from a manual produced by the word processing module, in conjunction with the graphics module, of FIG. 1.

DETAILED DESCRIPTION OF THE PREFERRED EMBODIMENTS

Figure 1:
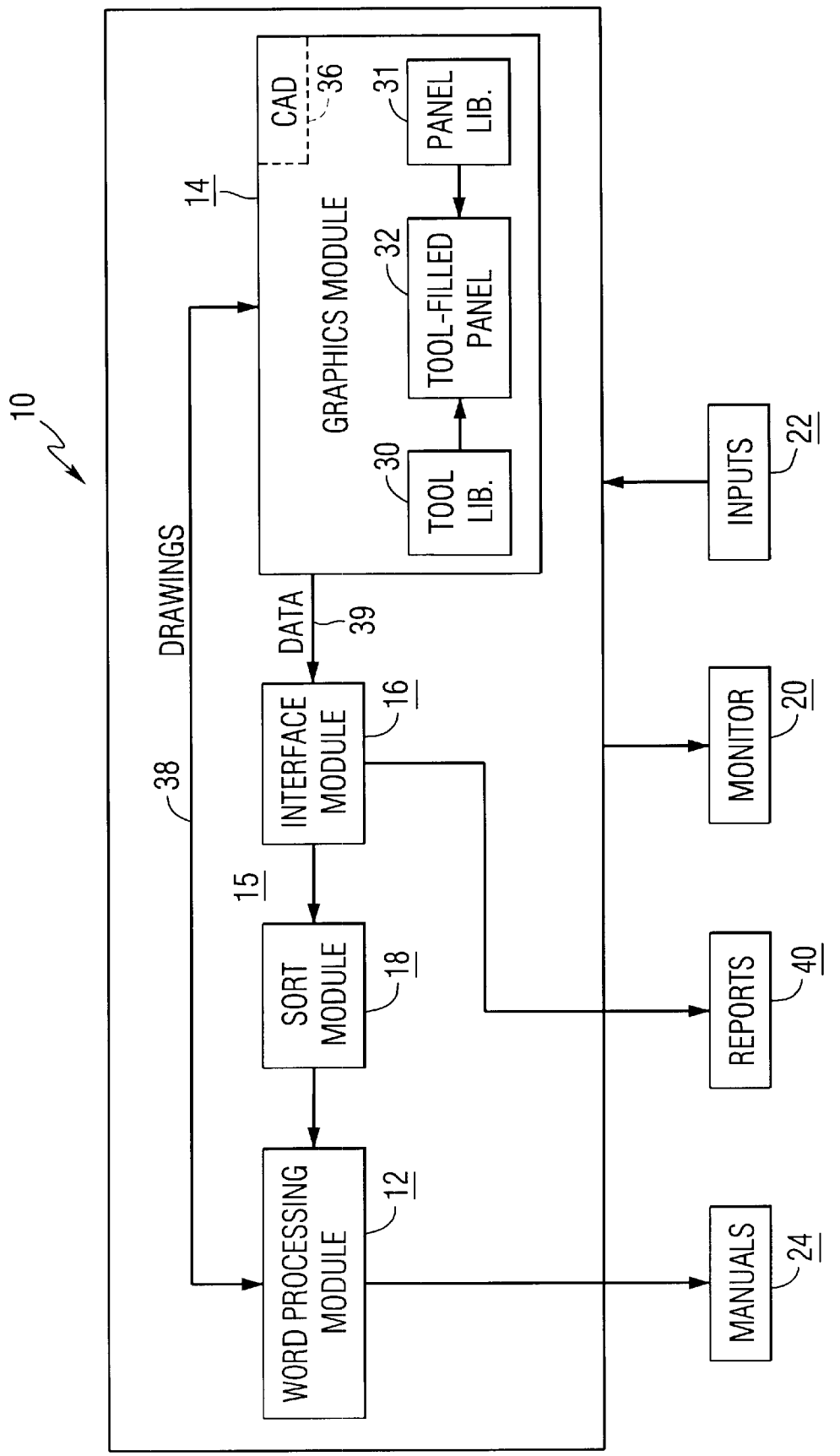
FIG. 1 is a block diagram of a computer system instrumental in practicing the present invention.

In the drawings, which are not necessarily to scale, like or corresponding parts are denoted by like or corresponding reference numerals.

The tool management system described herein enables personnel to keep track of every tool used in a maintenance task so as to avoid serious damage which may be caused by a missing tool. A custom toolbox is designed for each of a multitude of maintenance operations and each custom toolbox is inventoried before a maintenance task begins and after it is complete, so that any missing tool or tools can be readily identified. All of the tool and toolbox information is contained in a document which can easily be updated to accommodate for new, or no longer used, tools or toolboxes.

The tool management documentation, in accordance with the present invention, is accomplished with the provision of a computer system 10, various functional portions of which are illustrated in FIG. 1. Computer system 10 may be constituted by a commercial PC having an operating system (not illustrated) such as Windows, a product of Microsoft Corporation.

Computer system 10 includes a word processing module 12, a graphics module 14, and a data interface arrangement 15 comprised of an interface module 16 and a sort module 18. Computer displays are presented on a monitor 20, and programs, data and commands may be input via the input portion 22, which, for ease of use, preferably includes a mouse type of control for pointing, clicking and dragging items on the monitor screen.

Word processing module 12 provides for the generation and modification of documents such as technical manuals 24, each describing the tools and toolboxes needed for given maintenance tasks on a particular type of aircraft. As will be seen, a technical manual includes standard text which may be generated and edited in the word processing module 12 itself, as well as pictorial representations and data imported from the graphics module 14. The word processing module 12 may be constituted by a commercially available product, such as WORD, a product of Microsoft Corporation.

The graphics module 14 includes three libraries for the storage of graphical information created by the user. More particularly, a tool library 30 is operable to store tool representations, generally the outline or shape of the tool itself. The graphics module 14 allows the user to create and store these tool shapes. Similarly, a panel library 31 serves to store all of the user-created panels which may be used in the system and into which the tool shapes will be placed.

When creating a toolbox representation, comprised of one or more panels, a particular panel is selected from library 31 and displayed on the monitor 20. The tools to go into that panel are selected from library 30, also displayed on monitor 20, by simply clicking on the tool shape and dragging it to the selected panel, where the tool then assumes the proper size in relation to the panel. The tool-filled panel is stored in repository 32, ready for importation as a pictorial representation, into a selected manual of the word processing module 12. The graphics module 14 may be constituted by a commercially available product, such as VISIO Technical, a product of Microsoft Corporation. In a typical embodiment, the tool library 30 may be comprised of many thousands of tools. In order to simplify the task of drawing all of the possible tool shapes, a CAD (computer aided design) program 36 may additionally be used.

When creating the tool library 30, for each tool created, a data package is also created containing user inputted attributes for that tool. For example, the data associated with each tool may include the national stock number for that tool, the tool description, the part number, cost, the panel in which the tool is located, the tool's item number in a list of tools, and any other custom property to be associated with the tool.

The graphics created in graphics module 14 may be directly sent to word processing module 12, and vice versa, as depicted by path 38, while all of the data associated with the graphics is transferred via path 39 to the data interface arrangement 15. The interface module 16 transfers the extracted data to sort module 18, whereby selected data for a manual 24 are imported into the word processing module 12. If desired, the interface module 16 may also be operable to use the data to create reports 40 for management purposes.

A typical tool control manual 24, as illustrated in FIG. 2, is created for a particular aircraft and is comprised of various portions such as portions 44 to 47, by way of example. Portion 44 includes standard text, which is created and modified in the word processing module 12, as well as standard drawings of toolboxes used in the tool management program. Portion 45 includes data pertaining to the tools in the panels and is imported from the sort module 18. Portion 46 includes the graphics pertaining to the tools in the panels and is imported directly from the graphics module 14. Finally, portion 47 includes data pertaining to the tools used for all designated maintenance tasks for the aircraft, and is imported from the sort module 18.

Figure 3A:
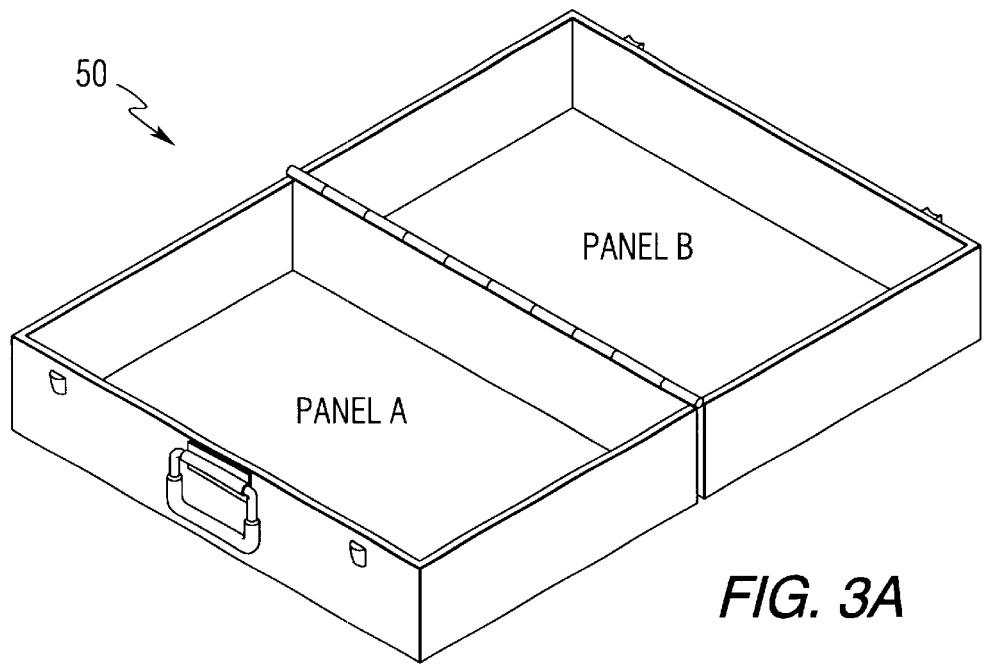
FIGS. 3A to 3D are views of various toolboxes which may be used for different maintenance tasks.
Figure 3B:
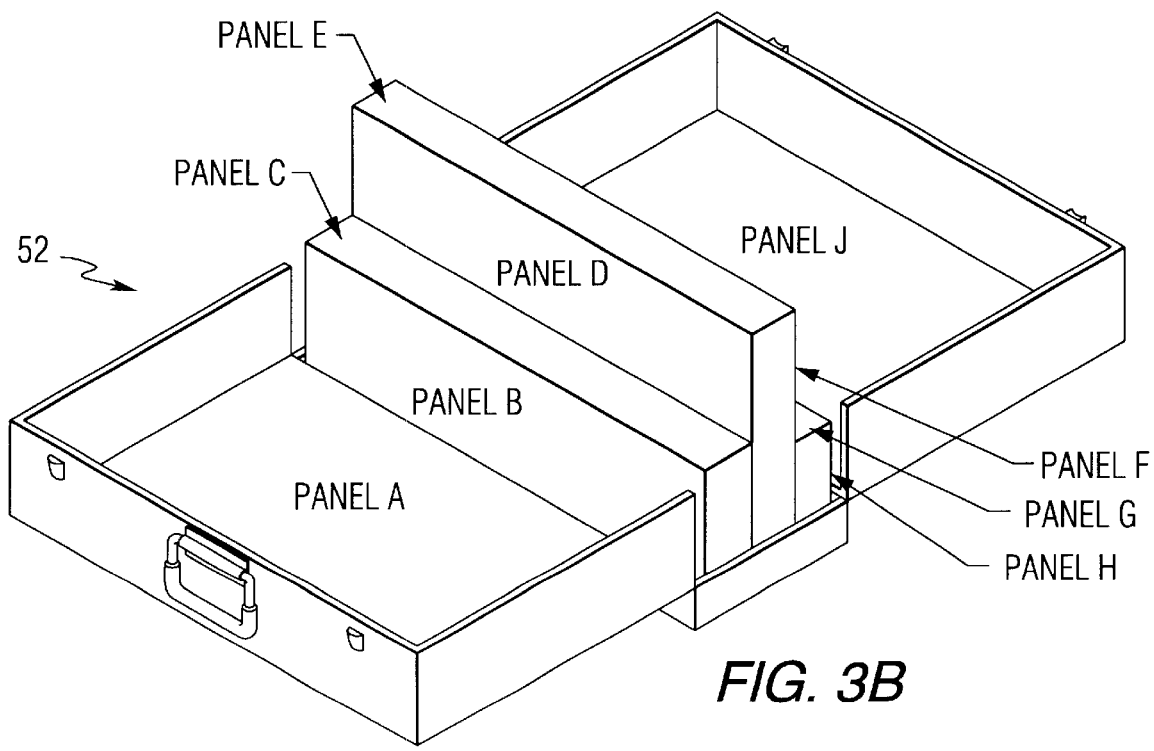
Figure 3C:
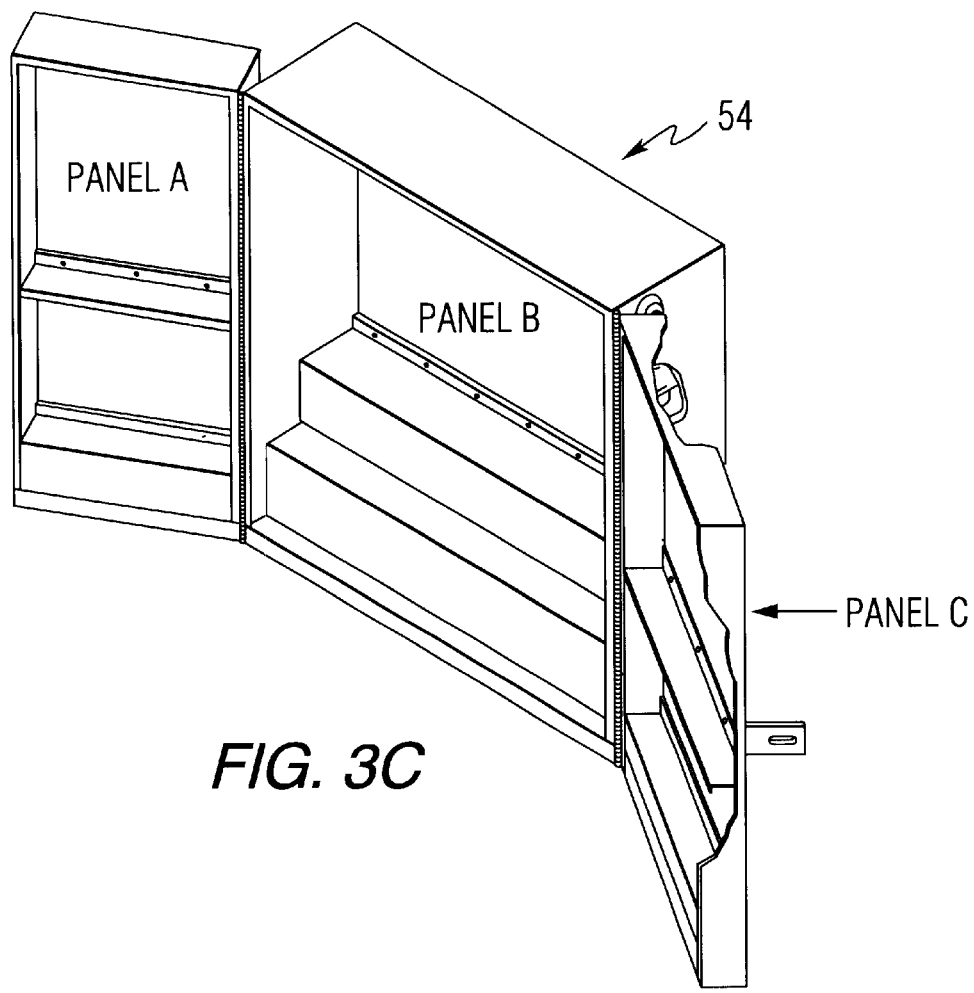
Figure 3D:
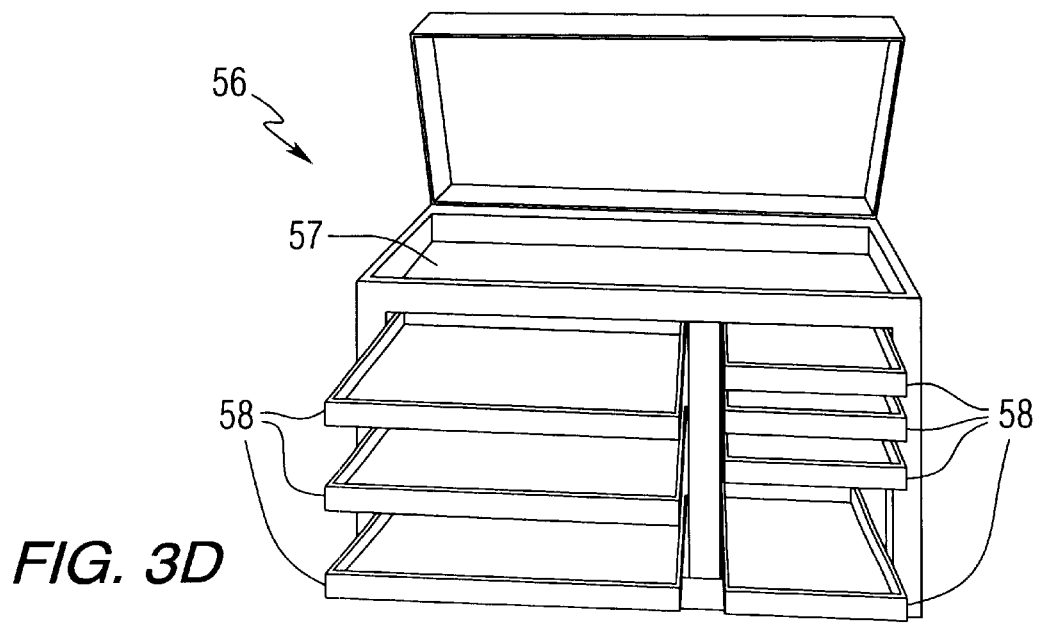

FIGS. 3A to 3D illustrate some typical toolboxes used for carrying, to a worksite, just the right tools for a particular maintenance task. FIG. 3A shows a toolbox 50 of the "briefcase" type having two panels, panel A and panel B, into which are placed and secured various tools for the maintenance task. FIG. 3B shows a toolbox 52 having a multitude of panels, panel A to panel J. FIG. 3C illustrates a "cabinet" type toolbox 54 having three panels, with panel A and panel C being located in the doors of the cabinet, and panel B being in the body of the cabinet. A fourth type of toolbox 56 is illustrated in FIG. 3D and is constituted by a top panel 57 and a plurality of draw panels 58. Many other types of toolboxes may be utilized, including a single panel in the form of a cloth pouch.

Figure 4B:
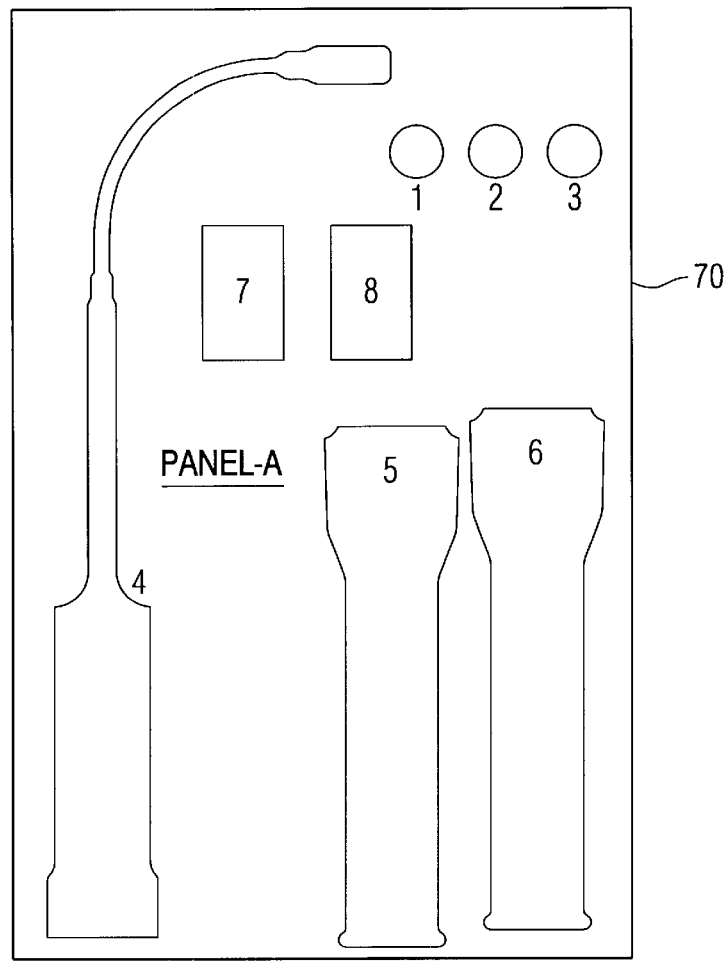

The present invention allows the graphic creation of selected panels with tool depictions placed within the panels, and the subsequent placement of the tool-filled panel into the manual, along with pertinent data associated with the tools. FIGS. 4A and 4B respectively illustrate two typical pages from a tool control manual 24 for an FA18 aircraft, model EF. In FIG. 4A, numeral 60 indicates the listing of tools contained within panel A of a QA-1 (quality assurance) toolbox, and numeral 62 indicates the item number for each tool. These data 60 and 62 are indicative of the type which are created within graphics module 14, (FIG. 1) extracted therefrom by interface module 16 and sorted for placement into manual 24 by the sort module 18.

Numeral 70 in FIG. 4B illustrates the panel A from the QA-1 toolbox, together with outlines of the tools placed within the panel. The tools, numbered 1 to 8 are those indicated, along with their respective item number, in FIG. 4A. The tool-filled panel is also created in the graphics module 14 and is directly provided to the manual 24 via path 38, without the requirement of the data interface arrangement 15. Although not illustrated, a panel B for QA-1 is also created, and the seven tools incorporated into panel B, along with their item number, are listed in FIG. 4A. It is to be noted that the use of the term "tool" herein is meant to be inclusive of any tool, instrument, device, or the like, used in the maintenance or repair task.

Figure 5:
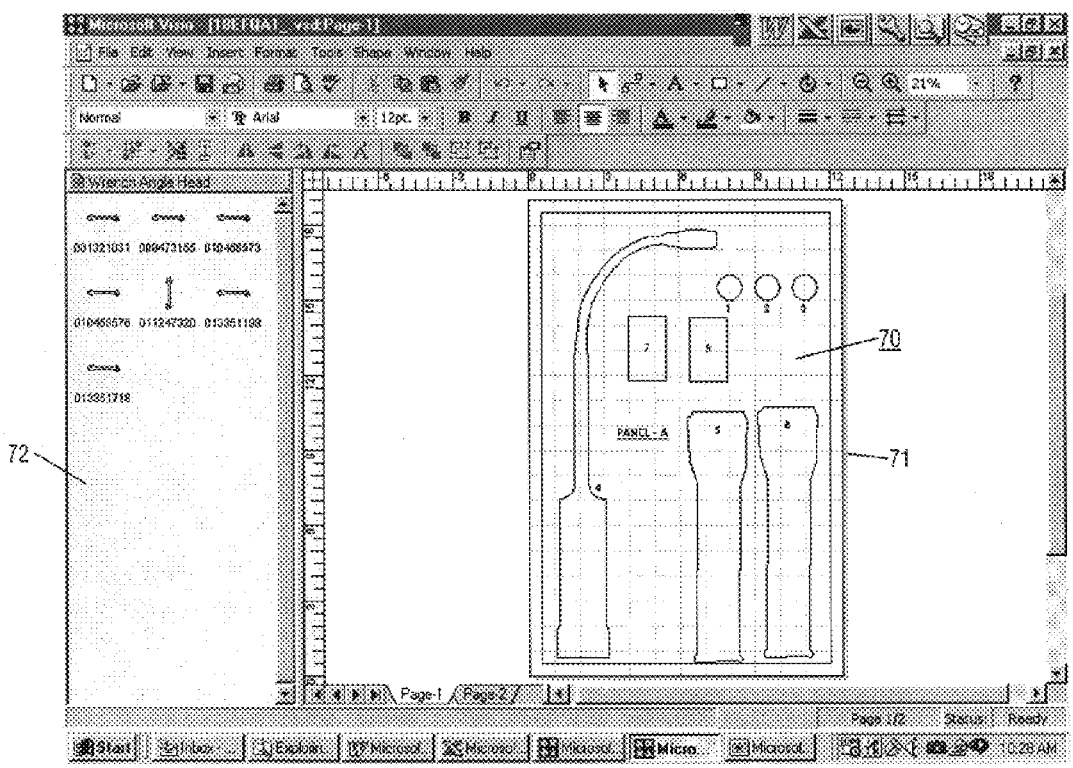
FIG. 5 is a view of a screen produced by the graphics module of FIG. 1.

In the process of creating or modifying a manual, the graphics module 14 is opened. FIG. 5 illustrates a typical screen that appears on the monitor 20, for creating or modifying a particular panel. More particularly, for illustrative purposes let it be assumed that panel A of FIG. 4B is to be modified. The tool-filled panel is designated by numeral 70 corresponding to that shown in FIG. 4B. During the initial creation, after a panel outline, such as 71, is selected from a panel library (31 of FIG. 1), a tool menu 72 is called up (from tool library 30) and displayed.

The tool library 30 may be comprised of various files containing respective tool types such as screwdrivers, wrenches, sockets, etc. A drop down menu (not illustrated) of the graphics module 14 allows an operator to select which file is to be displayed. Thereafter, a tool representation in menu 72 may be dragged into the panel 70, where the tool then assumes the proper size in relation to the panel. This process is continued until all of the proper tools are in the displayed panel. Other panels of a toolbox are then similarly created.

For an existing toolbox which is to be modified by adding or deleting tools, the appropriate panel is displayed in the graphics module 14, as in FIG. 5, by opening it in the graphics module 14 or by direct importation from word processing module 12. The modification is simply made by dragging a tool from menu 72 and placing it into the displayed panel, and/or dragging a tool already within the panel back to the tool menu.

Associated with each tool is a series of attributes or properties such as the description of the tool, the national stock number of that tool, the vendor's part number, the vendor's government ID number, the price of the tool, and any other data that a user may want to utilize. In addition, when a tool-filled panel is created or modified, the user inputs responds to a series of questions such as which panel the tool is in, which toolbox. the panel is in, what the item number of the tool is, etc. The responses to these questions also constitute data associated with the tools or toolboxes. Any renumbering of the items due to the addition or deletion of tools may be made in the graphics module 14.

After creation of the desired graphics, the interface module 16 is activated for extracting the data associated with these graphics. A user selection option is preferably included so that the interface module 16 allows the selection of a specific aircraft, a specific work center which has cognizance over a maintenance task, the toolbox or boxes which are to be modified and which specific data are to be transferred. The interface module 16 arranges and stores the data in a certain format, which is subsequently provided to the sort module 18. In addition, the interface module 16 may use the data for the creation of a special report 40, for management purposes.

The sort module 18 is operative to examine the transferred data and extract and sort only the desired information required for the creation or modification of the data portions 45 and 47 of the manual 24 (FIG. 2). Thus when a revised tool-filled panel is substituted for a previous one, the description portion 60 and item number portion 62 (FIG. 4A) are suitably modified. In addition, the listing of all of the tools in the program for the aircraft (data portion 47) is also revised. The operation of the sort module 18 is similar for the initial creation of a manual and the sort module 18 may be constituted by a commercially available product, such as EXCEL, a product of Microsoft Corporation.

Figure 6:
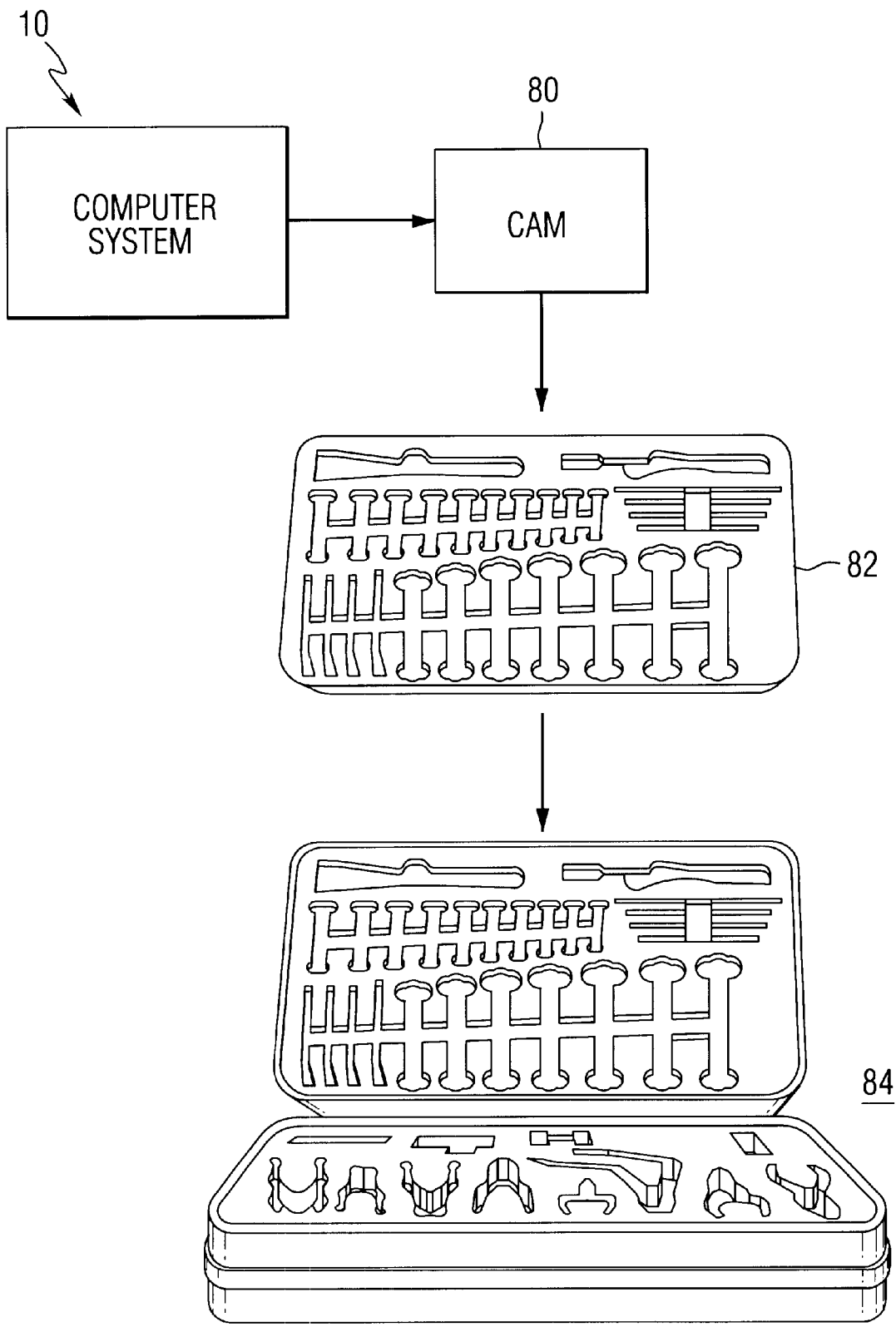
FIG. 6 illustrates an additional function which may be provided by the present invention.

In general, the tools within a panel may be held in position by means of mounting brackets, clips, or other types of fittings. FIG. 6 illustrates an alternate method of maintaining the tools in position, utilizing the present invention. In FIG. 6, the computer system 10, of FIG. 1, includes all of the shapes of the tools actively used in the maintenance program. Tool shape information for a particular panel of a toolbox is provided to a CAM (computer aided manufacturing) station 80 which, in response to the received information, is operative to cut the desired tool shapes into a panel insert 82, which may be of a foam material. The cut out panel is then inserted into a toolbox, such as toolbox 84 of the briefcase variety, ready to receive the appropriate tools.

The present invention allows the rapid manipulation and arrangement of any type of toolbox, and produces, with little expense or time expenditure, a tool manual depicting toolbox layout drawings, together with selected custom properties associated with the tools. This allows for improved accountability of tools after a maintenance task.

It will be readily seen to one of ordinary skill in the art that the present invention fulfills all of the objects set forth herein. After reading the foregoing specification, one of ordinary skill in the art will be able to effect various changes and substitutions of equivalents to the present invention as broadly disclosed herein. It is therefore intended that the protection granted hereon be limited only by the definition contained in the appended claims and equivalents. Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. A computer-based system for creating and modifying a tool management document, said document including graphics portions and data portions, said graphics portions representing tools positioned within panels of a toolbox, said tools being utilized to perform various maintenance tasks, comprising:

a computer having a word processing module, a graphics module and a data interface arrangement linking said word processing module and said graphics module;

said word processing module being operable, in response to a user input, to create text for said document;

said graphics module having stored tool representations and stored panel representations by which selected ones of said tools may be graphically placed into selected ones of said panels to create a tool-filled panel graphic;

said tool and panel representations having certain attributes defined by associated data; said attributes associated with said tool representations including a description of the tool, an item number of the tool in a list of tools within said panel, and a national stock number;

said word processing module and said graphics module being operable to directly exchange said graphics, whereby said tool-filled graphic may be modified in said graphics module and placed directly into said graphic portion of said document;

said data interface arrangement being operable to extract data defining said attributes from said graphics module to sort and place selected data into said data portion of said document, said data interface arrangement including an interface module linked to said graphics module for transfer of said data from said graphics module to said interface module, and a sort module linked to said interface module to receive said data and to select and sort only a certain portion of said data for placement into said document, wherein said data placed within said document includes said description of the tool and said item number of the tool in a list of tools within said panel.

2. A system according to claim 1 wherein:

said document includes a tool summary portion listing all of the tools utilized in performing all of said maintenance tasks;

said data defining said description of the tool and said national stock number of the tool are placed within said summary portion in a predetermined order with respect to other tool listings in said summary.

3. A system according to claim 2 wherein:

said interface module is additionally operable to generate reports which include selected data from said graphics module, including data other than that placed within said document.

4. A system according to claim 1 wherein:

said stored tool representations are stored by tool category.

5. A system according to claim 1 which includes:

a CAM system;

said CAM system being connected to said computer for receiving information relative to said tool-filled panel, and operable to create a full-scale model of said panel with cut out portions, for receiving said tools to be placed within said panel.

6. A method of creating and modifying a tool management document, comprising:

providing a computer having a word processing module, a graphics module, and a data interface arrangement including an interface module and a sort module;

using the graphics module to create a tool library comprising tool shapes and data associated with each tool shape and a panel library comprising panel shapes;

using the graphics module to create toolbox representations by selecting panel shapes from the panel library and tool shapes from the tool library;

using the graphics module to transfer the toolbox representations to the word processing module;

using the interface module to transfer the data associated with each tool shape from the graphics module to the sort module;

using the sort module to select at least some of the data associated with each tool shape and transfer the selected data to the word processing module; and using the word processing module to generate a tool management document comprising the toolbox representations and at least some of the data associated with each tool shape.

7. The method of claim 6 wherein the providing step includes providing a graphics module having a computer aided design program.

8. The method of claim 6 wherein the data associated with each tool shape includes a national stock number, a tool description, a part number, a cost, a panel in which the tool is located and a tool item number.

9. The method of claim 6 further comprising using the interface module to create a report containing at least a portion of the data associated with each tool shape.

10. The method of claim 6 wherein the data interface arrangement links the graphics module with the word processing module.

11. The method of claim 6 further comprising using the word processing module to create a tool management document comprising a tool summary portion listing all tools in the toolbox representations.

12. The method of claim 6 further comprising providing a CAM station connected to the computer.

13. The method of claim 12 further comprising manufacturing a panel shape from the panel library using the CAM station.

* * * * *